(12) United States Patent
Mathai et al.

(10) Patent No.: US 10,337,357 B2
(45) Date of Patent: **\*Jul. 2, 2019**

(54) STEAM TURBINE PREHEATING SYSTEM WITH A STEAM GENERATOR

(71) Applicant: General Electric Company, Schenectady, NY (US)

(72) Inventors: George Vargese Mathai, Atlanta, GA (US); Joseph Philip Klosinski, Kennesaw, GA (US); Sanji Ekanayake, Mableton, GA (US); Alston Ilford Scipio, Mableton, GA (US); William Theadore Fisher, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 285 days.

This patent is subject to a terminal disclaimer.

(21) Appl. No.: 15/420,776

(22) Filed: Jan. 31, 2017

(65) Prior Publication Data

US 2018/0216499 A1    Aug. 2, 2018

(51) Int. Cl.

| | |
|---|---|
| *F02C 6/06* | (2006.01) |
| *F02C 6/18* | (2006.01) |
| *F01D 25/10* | (2006.01) |
| *F01K 13/00* | (2006.01) |
| *F01K 13/02* | (2006.01) |
| *F01K 17/02* | (2006.01) |
| *F01K 23/10* | (2006.01) |

(52) U.S. Cl.
CPC ........... *F01K 13/025* (2013.01); *F01D 25/10* (2013.01); *F01K 13/003* (2013.01); *F01K 17/025* (2013.01); *F01K 23/10* (2013.01); *F02C 6/06* (2013.01); *F02C 6/18* (2013.01); *F05D 2220/72* (2013.01); *Y02E 20/14* (2013.01); *Y02E 20/16* (2013.01)

(58) Field of Classification Search
USPC ........ 290/52; 60/39.182, 652, 772, 773, 775
See application file for complete search history.

(56) References Cited

U.S. PATENT DOCUMENTS

| | | | |
|---|---|---|---|
| 2,247,845 A | 6/1939 | Meyer | |
| 2,470,729 A | 5/1947 | Stalker | |
| 3,448,580 A * | 6/1969 | Nettel | F01K 7/44 |
| | | | 60/503 |

(Continued)

FOREIGN PATENT DOCUMENTS

| | | |
|---|---|---|
| EP | 0083109 A2 | 7/1983 |
| EP | 0537307 A1 | 4/1993 |

(Continued)

OTHER PUBLICATIONS

Search Report, EP 18152057.8, dated Jun. 19, 2018 (9 pp.).
Search Report, EP 18152078.4, dated Jun. 28, 2018 (1 p.).

*Primary Examiner* — Pedro J Cuevas
(74) *Attorney, Agent, or Firm* — Eversheds Sutherland (US) LLP

(57) ABSTRACT

The present application provides a power generation system. The power generation system may include a gas turbine engine, a steam turbine, and a steam turbine preheating system. The steam turbine preheating system may include a steam generator that creates a flow of steam to preheat the steam turbine from an extraction of the gas turbine engine.

20 Claims, 6 Drawing Sheets

(56) References Cited

U.S. PATENT DOCUMENTS

| | | | |
|---|---|---|---|
| 3,448,581 A * | 6/1969 | Nettel | F01K 3/02 60/652 |
| 3,992,876 A | 11/1976 | Aguet | |
| 4,250,704 A | 2/1981 | Bruckner et al. | |
| 4,465,027 A | 8/1984 | Steinegger | |
| 4,584,836 A | 4/1986 | McClelland | |
| 4,831,817 A * | 5/1989 | Linhardt | F01K 23/067 60/39.12 |
| 4,896,499 A * | 1/1990 | Rice | F01D 5/185 60/39.182 |
| 5,042,246 A * | 8/1991 | Moore | F01D 19/00 60/39.182 |
| 5,132,007 A | 7/1992 | Meyer et al. | |
| 5,203,160 A * | 4/1993 | Ozono | F01D 19/00 60/39.182 |
| 5,269,130 A | 12/1993 | Finckh et al. | |
| 5,365,730 A | 11/1994 | Bruckner et al. | |
| 5,412,936 A | 5/1995 | Lee | |
| 5,473,898 A * | 12/1995 | Briesch | F01K 23/10 60/39.182 |
| 5,617,715 A | 4/1997 | Beer et al. | |
| 5,887,418 A | 3/1999 | Bruckner et al. | |
| 6,065,280 A | 5/2000 | Ranasinghe et al. | |
| 6,085,514 A * | 7/2000 | Benim | F01K 21/047 60/39.182 |
| 6,244,033 B1 | 6/2001 | Wylie | |
| 6,519,927 B2 | 2/2003 | Liebig | |
| 6,598,399 B2 | 7/2003 | Liebig | |
| 6,874,322 B2 * | 4/2005 | Schwarzott | B01F 3/0865 60/39.182 |
| 6,983,585 B2 | 1/2006 | Hattori et al. | |
| 7,367,192 B2 | 5/2008 | Hattori et al. | |
| 7,961,835 B2 * | 6/2011 | Keller | F01K 3/181 376/317 |
| 8,484,975 B2 | 7/2013 | West | |
| 8,505,309 B2 | 8/2013 | Gardiner et al. | |
| 8,955,322 B2 | 2/2015 | Bronicki et al. | |
| 9,046,037 B2 | 6/2015 | Broesamle et al. | |
| 9,217,566 B2 | 12/2015 | Bloch | |
| 9,222,410 B2 | 12/2015 | Chillar et al. | |
| 9,341,113 B2 | 5/2016 | John et al. | |
| 9,404,393 B2 | 8/2016 | Pang et al. | |
| 9,708,973 B2 | 7/2017 | Wall et al. | |
| 9,890,665 B2 * | 2/2018 | Carroni | F01K 23/10 |
| 2001/0015062 A1 * | 8/2001 | Fischer | F01K 23/106 60/39.182 |
| 2005/0150229 A1 | 7/2005 | Baer et al. | |
| 2005/0268594 A1 | 12/2005 | Kurihara | |
| 2006/0254280 A1 | 11/2006 | Briesch | |
| 2008/0236616 A1 | 10/2008 | Bloch | |
| 2009/0241551 A1 | 10/2009 | Grover | |
| 2010/0064855 A1 | 3/2010 | Lanyi et al. | |
| 2010/0146982 A1 | 6/2010 | Lanyi et al. | |
| 2010/0199631 A1 * | 8/2010 | Vilimec | F01K 21/045 60/39.182 |
| 2012/0031101 A1 | 2/2012 | Hoffmann et al. | |
| 2012/0227372 A1 * | 9/2012 | Li | F01K 7/38 60/39.182 |
| 2012/0260667 A1 | 10/2012 | Chillar et al. | |
| 2012/0317988 A1 | 12/2012 | Gardiner et al. | |
| 2013/0125557 A1 | 5/2013 | Scipio | |
| 2013/0160424 A1 | 6/2013 | Broesamle et al. | |
| 2013/0178677 A1 | 7/2013 | Schmid et al. | |
| 2013/0327051 A1 * | 12/2013 | Carroni | F01K 23/10 60/772 |
| 2014/0109844 A1 | 4/2014 | Wall et al. | |
| 2014/0110092 A1 | 4/2014 | John et al. | |
| 2014/0116063 A1 * | 5/2014 | Deng | F02C 3/24 60/780 |
| 2014/0174477 A1 | 6/2014 | Bloch | |
| 2014/0174559 A1 | 6/2014 | Bloch | |
| 2014/0230862 A1 | 8/2014 | Bloch | |
| 2014/0237839 A1 | 8/2014 | Bloch | |
| 2014/0238507 A1 | 8/2014 | Bloch | |
| 2015/0136046 A1 | 5/2015 | Millner et al. | |
| 2015/0345390 A1 | 12/2015 | Ekanayake | |
| 2015/0345393 A1 | 12/2015 | Ekanayake | |
| 2015/0345401 A1 | 12/2015 | Ekanayake | |
| 2016/0040596 A1 | 2/2016 | Klosinski | |
| 2016/0123190 A1 | 5/2016 | Klosinski | |
| 2016/0258327 A1 | 9/2016 | Klosinski | |
| 2016/0273408 A1 | 9/2016 | Ekanayake | |
| 2016/0290214 A1 | 10/2016 | Ekanayake | |
| 2016/0290232 A1 | 10/2016 | Ekanayake | |
| 2016/0290235 A1 | 10/2016 | Ekanayake | |
| 2016/0326960 A1 | 11/2016 | Baladi et al. | |
| 2017/0254225 A1 | 9/2017 | Kim et al. | |
| 2018/0058334 A1 | 3/2018 | Mathai et al. | |
| 2018/0073440 A1 | 3/2018 | Mathai et al. | |
| 2018/0100442 A1 | 4/2018 | Mathai et al. | |
| 2018/0119577 A1 | 5/2018 | Zhang et al. | |
| 2018/0216497 A1 * | 8/2018 | Klosinski | F01K 7/16 |
| 2018/0216499 A1 | 8/2018 | Mathai et al. | |
| 2018/0274391 A1 | 9/2018 | Mathai et al. | |
| 2018/0298816 A1 | 10/2018 | Conde | |

FOREIGN PATENT DOCUMENTS

| | | |
|---|---|---|
| EP | 0605156 A2 | 7/1994 |
| EP | 2738360 A1 | 6/2014 |
| JP | S5993907 A | 5/1984 |

* cited by examiner

STEAM TURBINE PREHEATING SYSTEM WITH A STEAM GENERATOR

TECHNICAL FIELD

The present application and the resultant patent relate generally to turbomachinery and more particularly relate to a power generation system with a steam turbine having a preheating system for using hot combustion gas extractions from a gas turbine to create a flow of steam in a steam generator to warm the steam turbine during start-up.

BACKGROUND OF THE INVENTION

A power generation plant such as a combined cycle power generation system generally includes a gas turbine engine, a heat recovery steam generator, and a steam turbine. The gas turbine engine may be coupled with a generator to produce electricity or to drive other types of loads. The hot combustion gases from the gas turbine engine may be introduced into the heat recovery steam generator to generate a flow of steam. The flow of steam in turn may drive the steam turbine. The steam turbine also may be coupled to a generator to produce additional electricity. A co-generation power generation system and the like may operate in a similar manner to produce both electricity and heat.

Minimizing start-up times may improve the availability of the combined cycle power plant and may reduce overall maintenance costs and start-up emissions. Steam turbine start-up, however, may be slow relative to gas turbine start-up. The start-up time of the steam turbine may be limited by thermal stresses caused by temperature gradients between, for example, the rotor core and the blades. As the rotor temperature is increased, higher inlet steam temperatures may be allowed. Gas turbine output, however, may not be allowed to increase until the steam turbine and the internal rotor are heated to a sufficient temperature. Running the gas turbine at such a low output may reduce the overall power generation, may waste fuel, and may cause higher concentrations of emissions.

SUMMARY OF THE INVENTION

The present application and the resultant patent thus provide a power generation system. The power generation system may include a gas turbine engine, a steam turbine, and a steam turbine preheating system. The steam turbine preheating system may include a steam generator that creates a flow of steam to preheat the steam turbine from an extraction of the gas turbine engine.

The present application and the resultant patent further provide a method of preheating a steam turbine in a power generation system. The method may include the steps of extracting hot combustion gases from a gas turbine to a steam generator, flowing feedwater to the steam generator, exchanging heat between the hot combustion gases and the flow of feedwater to create a flow of steam in the steam generator, and flowing the steam to the steam turbine to warm a shell of the steam turbine.

The present application and the resultant patent further provide a combined cycle power generation system. The combined cycle power generation system may include a gas turbine engine, a steam turbine, a heat recovery steam generator, and a steam turbine preheating system. The steam turbine preheating system may include a steam generator that creates a flow of steam to preheat the steam turbine from an extraction of the gas turbine engine and a flow of feedwater.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
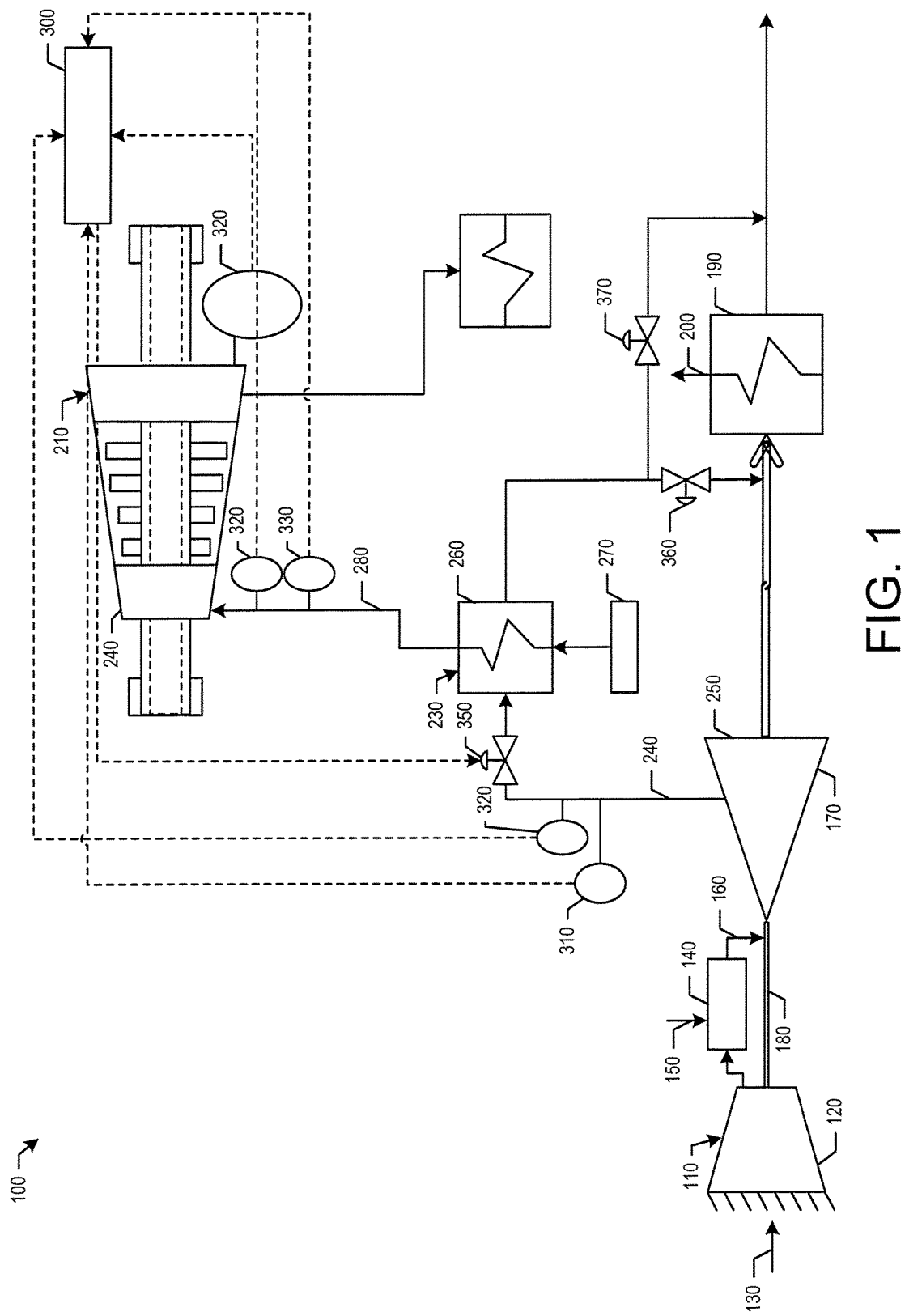
FIG. 1 is a schematic diagram of a combined cycle power generation system with a steam turbine preheating system as may be described herein.

Referring now to the drawings, in which like numerals refer to like elements throughout the several views, FIG. 1 shows a schematic diagram of a combined cycle power generation system 100 as may be described herein. The combined cycle power generation system 100 may include a gas turbine engine 110. The gas turbine engine 110 may include a compressor 120. The compressor 120 compresses an incoming flow of air 130. The compressor 120 delivers the compressed flow of air 130 to a combustor 140. The combustor 140 mixes the compressed flow of air 130 with a pressurized flow of fuel 150 and ignites the mixture to create a flow of hot combustion gases 160. Although only a single combustor 140 is shown, the gas turbine engine 110 may include any number of combustors 140 positioned in a circumferential array or otherwise. The flow of combustion gases 160 is in turn delivered to a turbine 170. The flow of combustion gases 160 drives the turbine 170 so as to produce mechanical work. The mechanical work produced in the turbine 170 drives the compressor 120 via a shaft 180 and an external load such as an electrical generator and the like.

The gas turbine engine 110 may use natural gas, various types of syngas, liquid fuels, and/or other types of fuels and blends thereof. The gas turbine engine 110 may be any one of a number of different gas turbine engines offered by General Electric Company of Schenectady, N.Y., including, but not limited to, a 7 or a 9 series heavy duty gas turbine engine and the like. The gas turbine engines 110 may have many different configurations and may have other types of components. Other types of gas turbine engines also may be used herein. Multiple gas turbine engines, other types of turbines, and other types of power generation equipment also may be used herein together.

The combined cycle power generation system 100 may include a heat recovery steam generator 190. The heat recovery steam generator 190 may recover heat from the hot combustion gases 160 exiting the gas turbine engine 110 so as to create a flow of steam 200. The heat recovery steam generator 190 may be of conventional design and may include one or more pressure sections such as a high pressure section, an intermediate pressure section, and a low pressure section. Each pressure section may include any combination of evaporators, superheaters, economizers, and the like. Other components and other configurations may be used herein.

The combined cycle power generation system 100 also may include a steam turbine 210. The steam turbine 210 may be of conventional design and may include one or more pressure sections such as a high pressure section, an intermediate pressure section, and a low pressure section. The flows of steam 200 from the heat recovery generator 190 may be expanded in the steam turbine 210 so as to drive an additional load such as an electrical generator and the like. The steam turbine 210 may include a condenser 220 for the recovery of the spent fluid flow therein. Other components and other configurations may be used herein.

The combined cycle power generation system 100 also may include a steam turbine preheating system 230. The steam turbine preheating system 230 may include one or more extractions 240 of the hot combustion gases 160 from a casing 250 of the turbine 170 or elsewhere. The casing 250 may be modified to include flanges at various stages to allow for the extractions 240. The extractions 240 may be in communication with a steam generator 260. The steam generator 260 may be of conventional design. Specifically, the steam generator 260 may be a heat exchanger that exchanges heat between the hot combustion gases 160 from the turbine 170 and a flow of feedwater 270 from any source so as to create a flow of steam 280. The flow of steam 280 may be sent to a shell 290 of the steam turbine 210 so as to preheat the steam turbine 210 before and/or during start-up. The steam/condensate exiting the steam turbine shell 290 may pass into the condenser 220 or otherwise. The extracted combustion gases 160 passing through the steam turbine 210 may flow either upstream of the heat recovery steam generator 190 so as to exchange heat therein or downstream of the heat recovery steam generator 190 towards the main stack or otherwise. Other components and other configurations may be used herein.

Overall control of the steam turbine preheating system 230 may be governed via a controller 300. The controller 300 may be any type of programmable logic device. The controller 300 may be local or remote. The controller 300 may receive data from a number of sensors in communication with the steam turbine preheating system 230. These sensors may include a flow rate sensor 310, one or more temperature sensors 320, a pressure sensor 330, and the like. Other types of sensors may be used herein. Based upon the data from the sensors and the overall steam turbine controls 340, the controller 300 may open and close the steam turbine preheating system 230 via an inlet valve 350 and one or more outlet valves. In this embodiment, a first outlet valve 360 and a second outlet valve 370 are shown. Other types of flow control devices and the like also may be used herein. Other components and other configurations may be used herein.

In use, the controller 300 may receive information on overall operational parameters of the steam turbine 210 via the steam turbine controls 340 including, for example, the temperature of the rotor and/or the blades. In order to preheat the steam turbine 210, the controller 300 may open the inlet valve 350 of the steam turbine preheating system 230 so as to allow the extraction 240 of the hot combustion gases 160 from the turbine casing 250 to flow to the steam generator 260. The hot combustion gases 160 exchange heat with the flow of feedwater 270 in the steam generator 260 so as to create the flow of steam 280. The flow of steam 280 thus may be used to warm the steam turbine shell 290.

The controller 300 may monitor the flow rate and the temperature of the extraction 240 upstream of the steam generator 290 via the flow rate sensor 310 and one of the temperature sensors 320. The controller 300 also may monitor the temperature and pressure of the steam 280 downstream of the steam generator 260 via one of the temperature sensors 320 and the pressure sensor 330. Once the steam turbine 210 reaches a predetermined temperature, the controller 300 may turn off the steam turbine preheating system 230 by closing the inlet valve 350 or otherwise. Closing the inlet valve 350 directs all of the combustion gases 160 towards the turbine 170 and the heat recovery steam generator 190. Other components and other configurations may be used herein.

Figure 2:
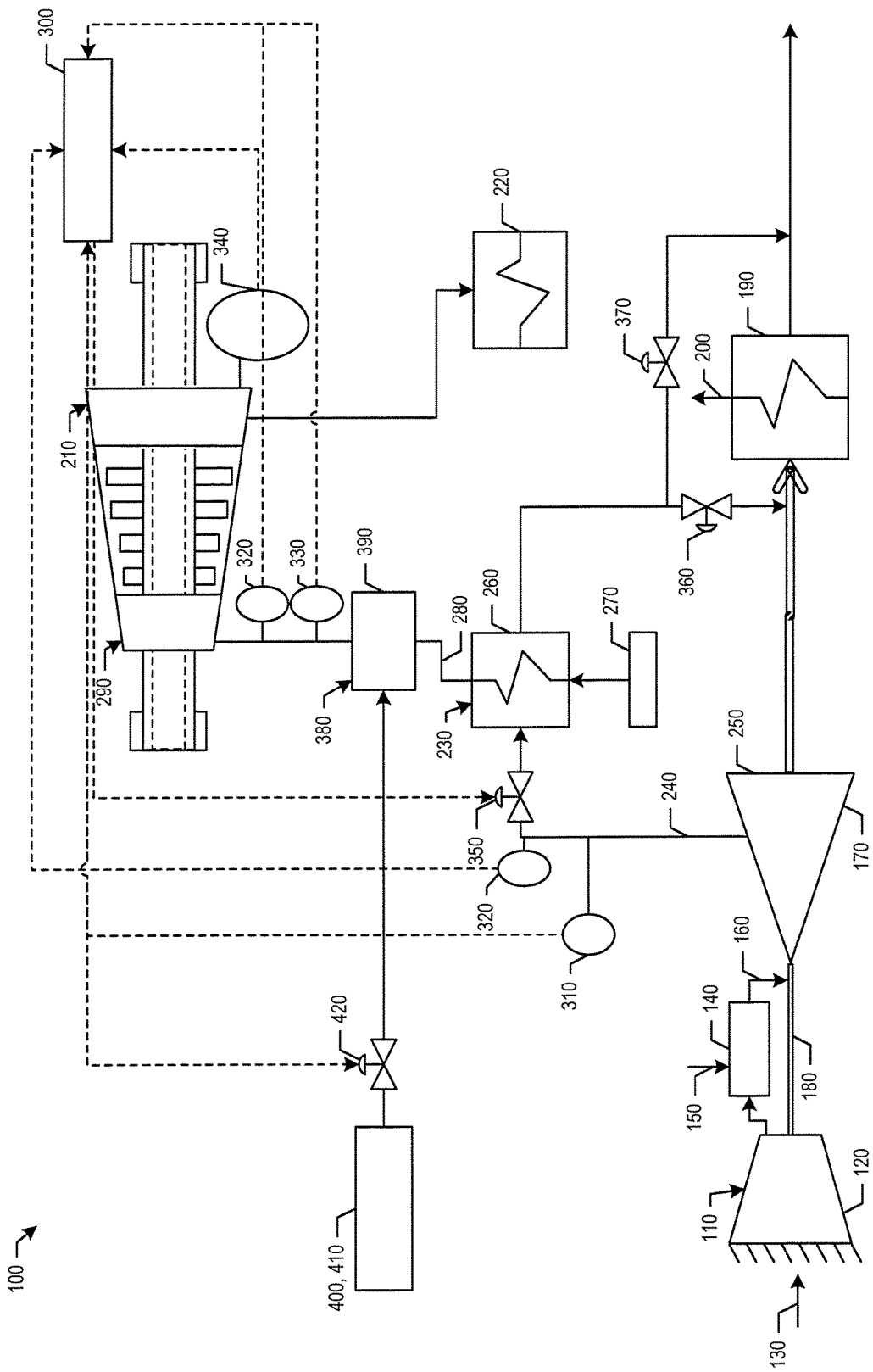
FIG. 2 is a schematic diagram of an alternative embodiment of a combined cycle power generation system with a steam turbine preheating system as may be described herein.

FIG. 2 shows a further embodiment of the steam turbine preheating system 230 as may be described herein. In this example, the steam turbine preheating system 230 may include an attemperation system 380 positioned downstream of the steam generator 260. The attemperation system 380 may include a spray system 390 in communication with either a water injection 400 or a steam injection 410 via a spray system valve 420. The spray system 390 may be an in-line mixer, a spray chamber, or any type of conventional device for tempering a fluid flow. Specifically, the spray system 390 may use either the water injection 400 or the steam injection 410 for temperature control of the flow of steam 280 exiting the steam generator 260. The controller 300 may operate the attemperation system 380 via the spray system valve 420 based upon the temperature of the flow of steam 280 as determined by one of the temperature sensors 320 or otherwise. Other components and other configurations may be used herein.

Figure 3:
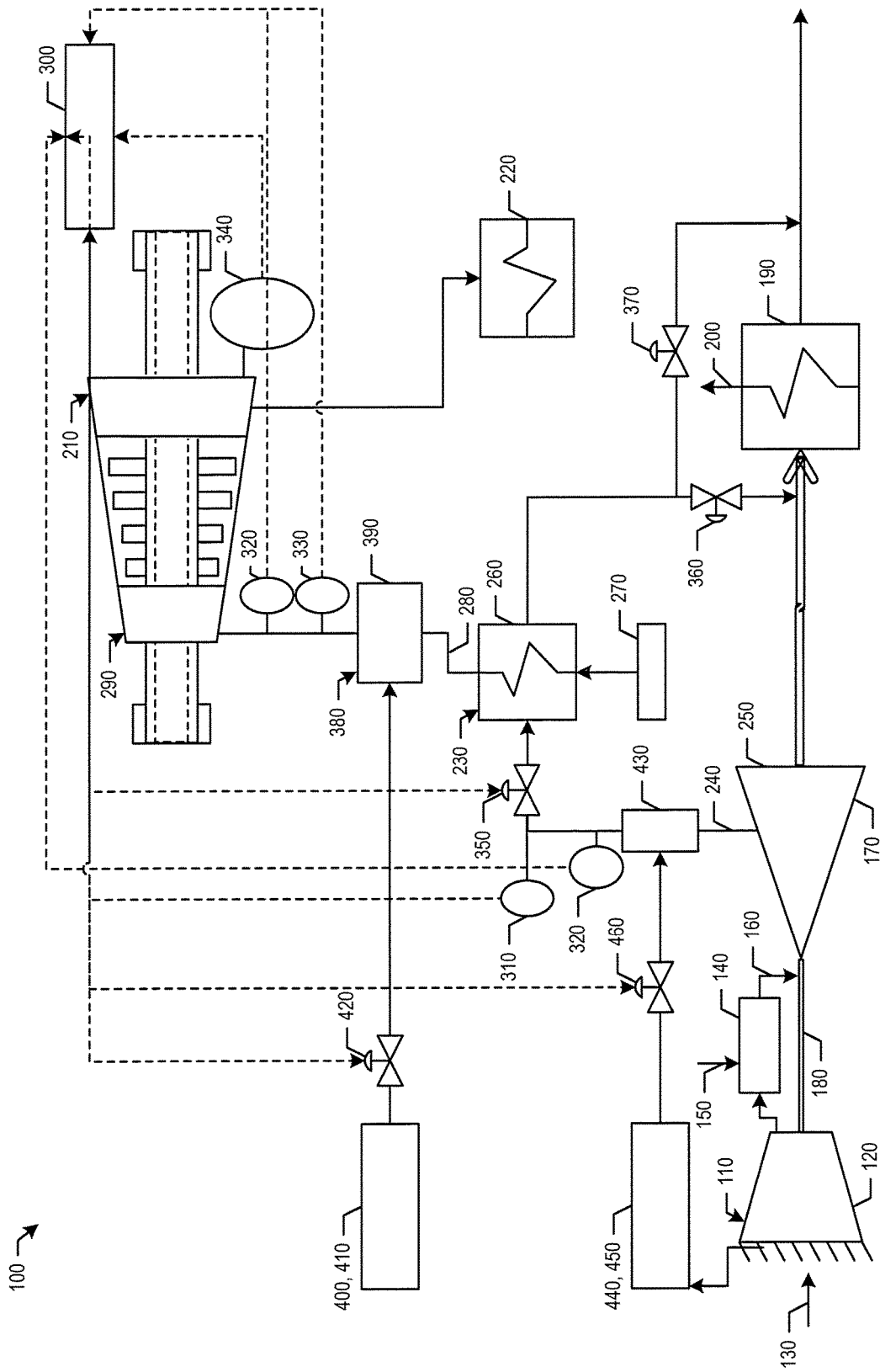
FIG. 3 is a schematic diagram of an alternative embodiment of a combined cycle power generation system with a steam turbine preheating system as may be described herein.

FIG. 3 shows a further embodiment of the steam turbine preheating system 230 as may be described herein. In this example, an ejector 430 may be positioned on the extraction 240 from the casing 250 of the turbine 170. The ejector 430 may be in communication with a source of ambient air 440 or filtered air 450 via an ejector valve 460. The ejector 430 pulls in the ambient air or the filtered air so as to increase the mass flow rate of the flow of hot combustion gases 160 flowing through the steam generator 260. The ejector 430 may be of conventional design. Specifically, the ejector 430 may be a mechanical device with no moving parts. The ejector 430 mixes two fluid streams based on a momentum transfer. The flow of ambient air or filtered air to the ejector 430 may be controlled by an ejector valve 460. The flow rate may be monitored by the controller 300 via the flow rate sensor 310 or otherwise. Other components and other configurations may be used herein.

Figure 4:
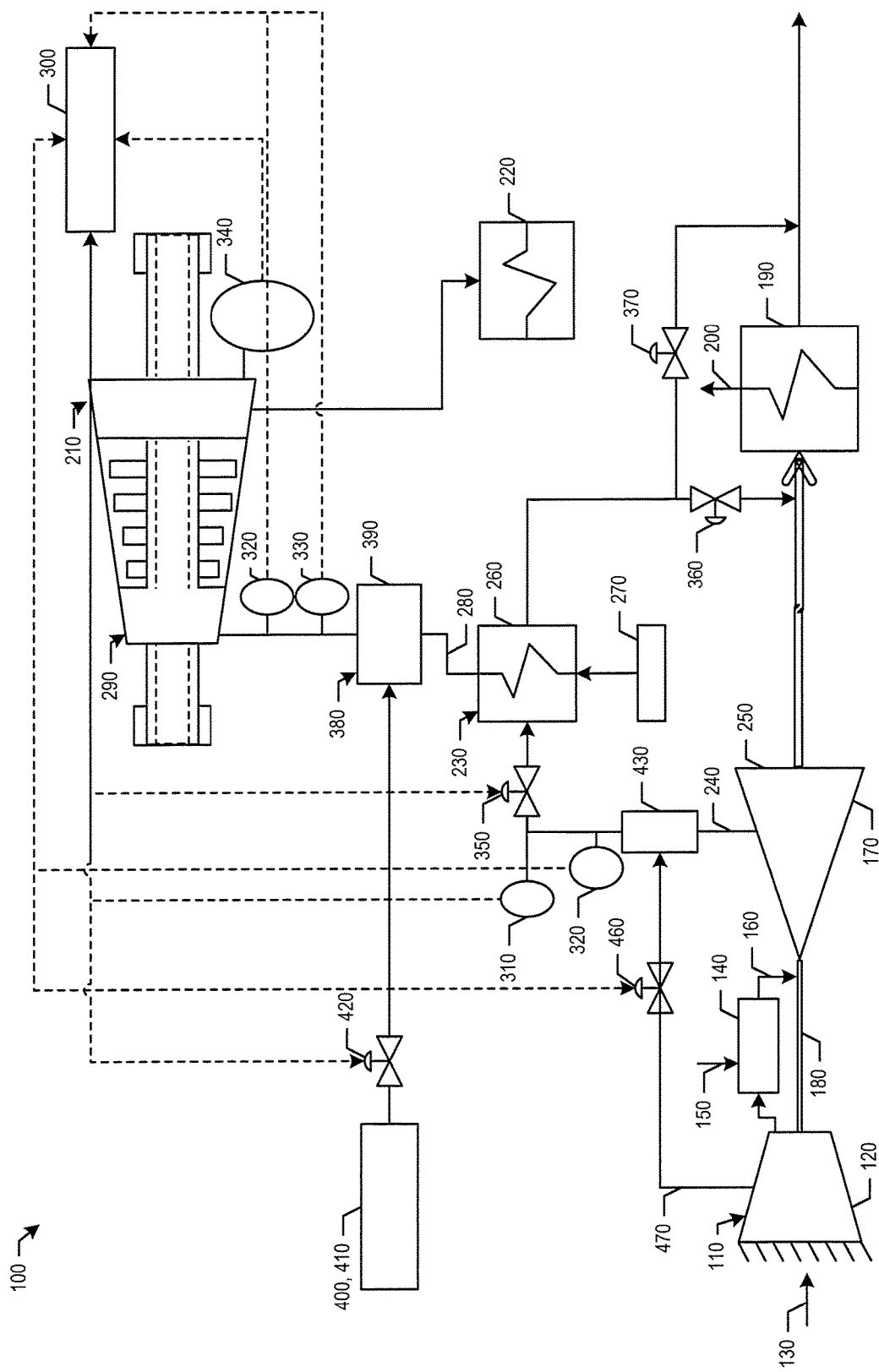
FIG. 4 a schematic diagram of an alternative embodiment of a combined cycle power generation system with a steam turbine preheating system as may be described herein.

FIG. 4 shows a further embodiment of the steam turbine preheating system 230 as may be described herein. In this example, the ejector 430 may use a compressor air extraction 470 instead of the ambient air 440 or the filtered air 450 described above. The compressor air extraction 470 may be delivered to the ejector 430 so as to increase the mass flow rate to the steam generator 260. The flow rate may be monitored by the controller 300 via the flow rate sensor 310 or otherwise. Other components and other configurations may be used herein.

Figure 5:
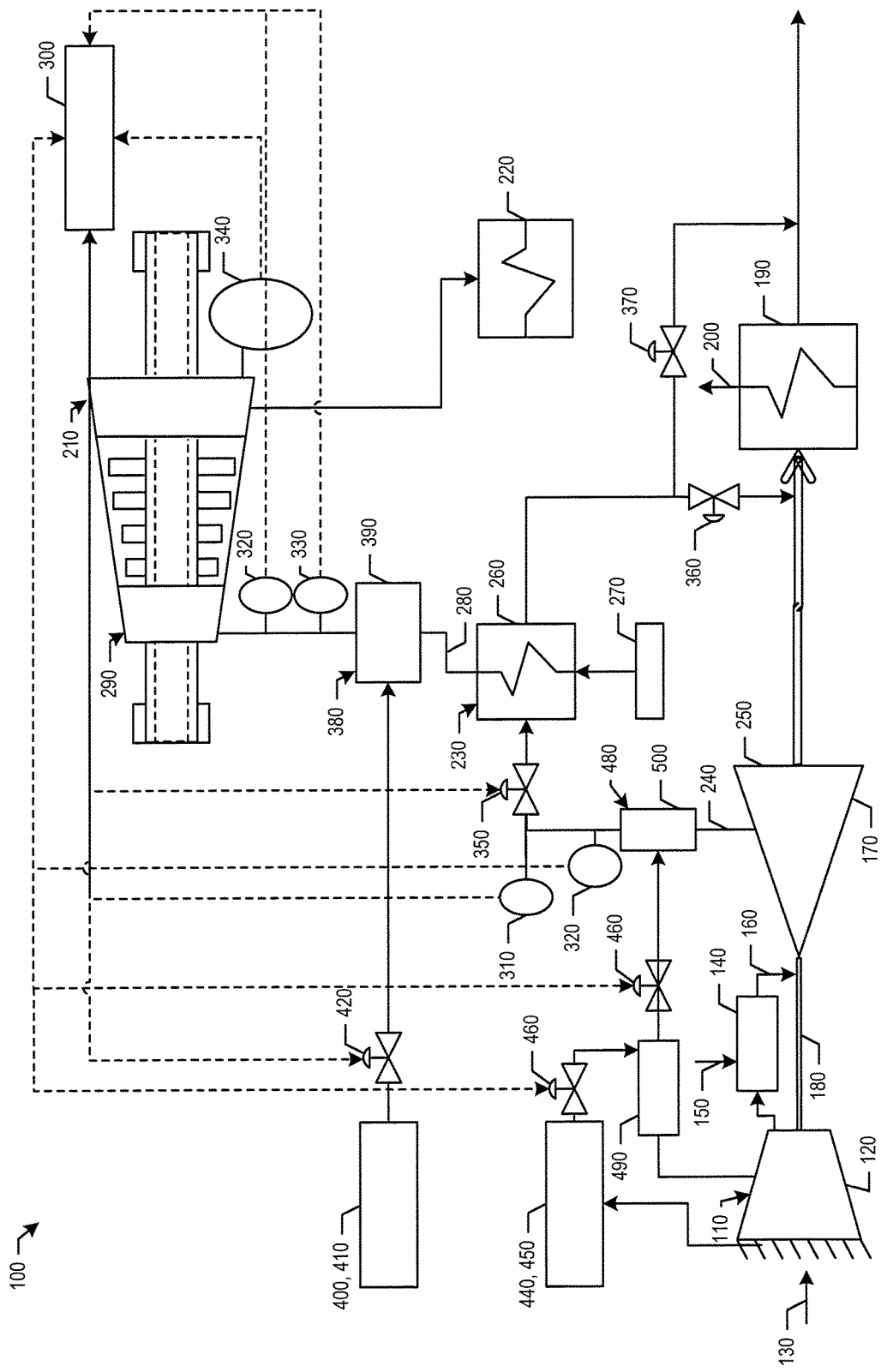
FIG. 5 is a schematic diagram of an alternative embodiment of a combined cycle power generation system with a steam turbine preheating system as may be described herein.

FIG. 5 shows a further embodiment of the steam turbine preheating system 230 as may be described herein. In this example, the steam turbine preheating system 230 may use a cascading ejector system 480. The cascading system ejector system 480 may use a first ejector 490. The first ejector 490 may pull in either the ambient air 440 or the filtered air 450 and the compressor air extraction 470 to create a first mixed flow. This first mixed flow then may be sent to a second ejector 500. The second ejector 500 may be in communication with the extraction 240 from the casing 250 of the turbine 170. The resultant flow then may be forwarded to the steam generator 260 to increase the mass flow rate therethrough. The flow rate may be monitored by the controller 300 via the flow rate sensor 310 or otherwise. Other components and other configurations may be used herein.

Figure 6:
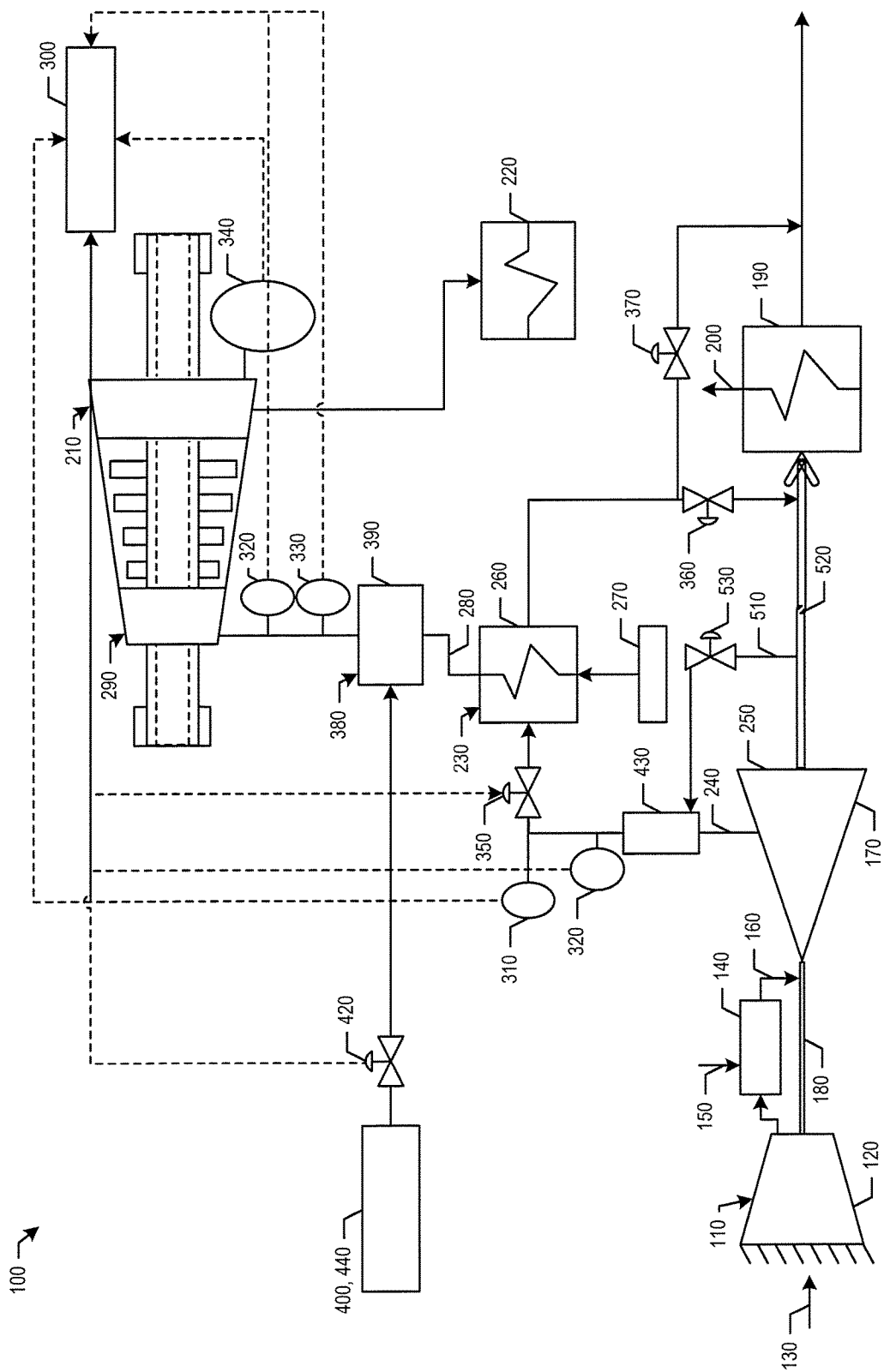
FIG. 6 is a schematic diagram of an alternative embodiment of a combined cycle power generation system with a steam turbine preheating system as may be described herein.

FIG. 6 shows a further embodiment of the steam turbine preheating system 230 as may be described herein. In this embodiment, the ejector 430 may be in communication with a further combustion gas extraction 510 from downstream of the turbine 170 or otherwise. Specifically, a downstream exhaust duct 520 may direct the further combustion gas extraction 510 to the ejector 430 via an exhaust valve 530. The extractions 240, 510 may be mixed in the ejector 430 so as to increase the mass flow rate therethrough. The flow rate may be monitored by the controller 300 via the flow rate sensor 310 or otherwise. Other components and other configurations also may be used herein.

The embodiments of the steam turbine preheating system 230 thus may use the extractions 240 of the hot combustion gases 160 from the casing 250 of the turbine 170 so as to create a flow of steam 280 in the steam generator 260. The flow of steam 280 may be used in turn to preheat the steam turbine 210. Preheating the steam turbine 210 during start-up should reduce the overall start-up time of the plant as a whole. Specifically, the plant may not have to wait for traditional steam conditions to be met before introducing steam to the steam turbine to begin the warming process. Reducing start-up time generally lowers emissions and improves fuel consumption. Moreover, improved-start up times also provides operational flexibility, increased performance, and increased competitiveness.

It should be apparent that the foregoing relates only to certain embodiments of the present application and the resultant patent. Numerous changes and modifications may be made herein by one of skill in the art without departing from the general spirit and scope of the invention as defined by the following claims and the equivalents thereof.

We claim:

1. A power generation system, comprising:
a gas turbine engine;
a steam turbine; and
a steam turbine preheating system;
wherein the steam turbine preheating system comprises a steam generator that creates a flow of steam to preheat the steam turbine from an extraction of the gas turbine engine.

2. The power generation system of claim 1, wherein the gas turbine engine comprises a turbine casing and wherein the extraction extends from the turbine casing to the steam generator.

3. The power generation system of claim 1, wherein the extraction comprises an extraction of hot combustion gases.

4. The power generation system of claim 1, wherein the steam generator comprises a source of feedwater in communication therewith.

5. The power generation system of claim 1, wherein the steam turbine comprises a steam turbine shell and wherein the flow of steam extends from the steam generator to the steam turbine shell.

6. The power generation system of claim 1, further comprising a controller in communication with a plurality of sensors.

7. The power generation system of claim 1, further comprising a heat recovery steam generator.

8. The power generation system of claim 1, wherein the steam turbine preheating system comprises an attemperation system.

9. The power generation system of claim 8, wherein the attemperation system comprises a spray system for at least one of a water injection and a steam injection.

10. The power generation system of claim 1, wherein the steam turbine preheating system comprises an ejector in communication with the steam generator.

11. The power generation system of claim 10, wherein the ejector is in communication with at least one of an ambient air flow, a filtered air flow, and a compressor air extraction.

12. The power generation system of claim 1, wherein the steam turbine preheating system comprises a cascading ejector system in communication with the steam generator.

13. The power generation system of claim 12, wherein the cascading ejector system comprises a first ejector in communication with a compressor of the gas turbine engine and a second ejector in communication with a turbine of the gas turbine engine.

14. The power generation system of claim 1, wherein the steam turbine preheating system comprises a further extraction from downstream of the gas turbine engine to the steam generator.

15. A method of preheating a steam turbine in a power generation system, comprising:
extracting hot combustion gases from a gas turbine to a steam generator;
flowing feedwater to the steam generator;
exchanging heat between the hot combustion gases and the flow of feedwater to create a flow of steam in the steam generator; and
flowing the steam to the steam turbine to warm a shell of the steam turbine.

16. A combined cycle power generation system, comprising:
a gas turbine engine;
a steam turbine;
a heat recovery steam generator; and
a steam turbine preheating system;
wherein the steam turbine preheating system comprises a steam generator that creates a flow of steam to preheat the steam turbine from an extraction of the gas turbine engine and a flow of feedwater.

17. The combined cycle power generation system of claim 16, wherein the gas turbine engine comprises a turbine casing and wherein the extraction extends from the turbine casing to the steam generator.

18. The combined cycle power generation system of claim 16, wherein the extraction comprises an extraction of hot combustion gases.

19. The combined cycle power generation system of claim 16, wherein the steam turbine comprises a steam turbine shell and wherein the flow of steam extends from the steam generator to the steam turbine shell.

20. The combined cycle power generation system of claim 16, wherein the steam turbine preheating system comprises a spray system for at least one of a water injection and a steam injection.

* * * * *